Oct. 7, 1941.  P. F. FISH  2,258,285

NESTING SHIPPING DRUM WITH HOOPS THEREFOR

Filed Aug. 1, 1938  7 Sheets-Sheet 1

INVENTOR.
Paul F. Fish
BY
ATTORNEYS.

Oct. 7, 1941.     P. F. FISH     2,258,285
NESTING SHIPPING DRUM WITH HOOPS THEREFOR
Filed Aug. 1, 1938     7 Sheets-Sheet 6

INVENTOR.
Paul F. Fish
BY
J. S. Dowling
ATTORNEYS.

Oct. 7, 1941.  P. F. FISH  2,258,285
NESTING SHIPPING DRUM WITH HOOPS THEREFOR
Filed Aug. 1, 1938   7 Sheets-Sheet 7

Paul F. Fish INVENTOR.
BY ATTORNEYS.

Patented Oct. 7, 1941

2,258,285

UNITED STATES PATENT OFFICE 2,258,285

NESTING SHIPPING DRUM WITH HOOPS THEREFOR

Paul F. Fish, Baltimore, Md.

Application August 1, 1938, Serial No. 222,367

2 Claims. (Cl. 220—5)

This invention relates to certain new and useful improvements in a nesting shipping drum provided with removable hoops at each end thereof, either in assembled or nested position, so as to permit the drum to be easily and quickly handled in a safe manner during the shipping thereof.

The principal object of the invention is to provide a shipping drum capable of when empty, to be readily nested one within the other, and removable hoops fitted thereto so that said drum may be easily handled incident to shipping thereof.

A still further object of the invention is the provision of nesting shipping drums, which, when empty, can be readily nested, and provided with hoops at opposite ends so that a greater proportion of drums can be returned at a cheaper rate than the original shipment thereof when in filled position.

A still further and important object of the invention is the provision of a nesting drum provided with removable hoops at opposite ends thereof, so as to prevent contact with the central portion of the drum during the handling thereof in order to prevent leakage incident to handling, and the said hoops permitting the easy handling of said drums in shipping thereof.

A still further object of the invention is the provision of a collapsible shipping drum capable of being assembled and provided with removable hoops at the opposite ends, which protect the connected portions of the sections and also permit the easy handling of said drums incident to the shipping thereof.

A further object of this invention is the provision of nesting drums divided into sections and equipped with fastening means whereby the sections are held against separation and leakage, and removable hoops at opposite ends thereof which positively prevent leakage at the connected portions of the sections and also permit the easy handling of said drums incident to shipping.

A further object of the invention is to equip the nesting drums with removable hoops, either when in filled or empty position, so that the sections can be handled quickly and easily, either when filled or empty, the hoops being readily removable and applied to the full drum sections, or easily applied to the sections when nested one within the other, which facilitates and expedites the easy handling thereof during shipment.

A still further object of the invention is the provision of nesting shipping drums provided with hoops, which hoops are of such construction as to be readily, removably attached to the sections, either when filled or empty, to facilitate the handling of said drums, both in the original and return shipment thereof, and said hoops also capable of being nested one within the other to facilitate the shipping thereof.

A further important object of the invention is the provision of a nesting drum of the collapsible type, capable of being fitted one within the other when empty, and equipped with removable hoops attached thereto and in such a manner that the drums can be quickly and easily handled when either filled or empty, and said hoops performing the dual function of facilitating the easy handling of the sections, either when filled or empty, and also protecting the drums against leakage incident to the fact that the diameter of the hoop is greater than the diameter of the drum to which it is attached, so that the connecting portion of the drum section, one within the other, is wholly within the plane of the diameter of the hoop.

A still further object of the invention is the provision of nesting shipping drums having hoops at opposite ends thereof and of such construction as to divert all strain from the central portion of the drums when filled, so as to protect and assure the shipper against leakage during shipment thereof.

With these and other objects in view, the invention consists in certain novel features, combination and arrangement of parts as will be hereinafter more fully described, pointed out in the accompanying drawings, and claimed.

In the drawings:

Figure 23 is a vertical sectional view, partly broken away, taken on the line 23—23 of Figure 22;

Figure 24 is a top plan view, illustrating the modified form shown in Figure 22; and, Figure 25 is a side elevational view, illustrating the method of full assembly of the drum, shown in Figures 22 to 24, inclusive, with the hoops attached thereto.

Referring to the drawings, like numerals of references designate corresponding parts throughout the several views.

Heretofore, in the use of nesting shipping drums, it has been found impossible to prevent the drums from leaking at their central connected portions due to the fact that the heavy contents of the sections, incident to handling thereof, spread the sections apart and cause leakage thereof, which is extremely costly and renders the use of these drums practically impossible due to their impracticability.

It is the aim of the present invention to overcome this serious objection and to provide a collapsible nesting shipping drum that will meet all of the requirements and conditions of the present day trade and at the same time will provide means wherein the drum can be knocked down when empty, readily nested, and by virtue of the removable hoops easily handled so that the return drums can be easily handled in shipping and the cost of shipping rates materially reduced.

It is a well known fact that in the handling of these drums, when filled, is a tremendous factor due to the weight thereof, but through the present invention and use thereof—the provision of removable hoops at opposite ends thereof—the handling of the drums is expedited and therefore can be easily and quickly accomplished.

Referring more particularly to the drawings, especially Figures 1 to 13, inclusive, I have shown and set up a new type of nesting shipping drum, which comprises in its construction divided sections 5 and 6, respectively, the section 5 constituting the female member, while section 6 constitutes the male member. These sections may be constructed of any material found suitable for the purpose, preferably being made of some metal that will withstand shocks and strain incident to shipping thereof. The sections 5 and 6, respectively, are substantially frusto-conical in construction and the smaller ends thereof are closed, as at 8 and 9, respectively, and are provided with suitable openings 10 equipped with the usual closure plugs 11.

The enlarged end of the female member 5 is provided exteriorly thereof with an annular channel member 12, in which is arranged a sealing gasket 13 and receives therein the open end of the male member 6, when the sections are fitted together in assembled position. The peripheral ends of the members 5 and 6, respectively, are bent back upon themselves, as at 14, to provide a re-enforcing end in order to assure of a firm fitting when the sections are arranged in assembled position.

To retain the sections in assembled position, a fastening element 15 extends vertically therethrough, its opposite ends being threaded and extending through the ends 8 and 9, respectively, and are held fastened therein by suitable fastening elements 16 attached to the threaded portions thereof.

By virtue of the sealing element 13 and fastening element 12, the sections 5 and 6, respectively, are held in firm assembled position and the contents may be easily put into the assembled sections through the openings 10 in the covers 8 and 9, respectively.

To the opposite exposed ends of the sections 5 and 6, respectively, there are secured supporting hoops 17, and the structures of both being identical, the description of one will serve for all. These hoops are of a diameter greater than that of the enlarged ends of the sections 5 and 6. Thus, when fastened to the exposed ends of these sections, any and all strain or contact on the inner fitted ends of the sections is eliminated.

These hoops are provided with suitable spider structures 18, having their ends fastened to the hoops and the central portion provided with an opening to be received by the fastening element 15 and sealed to the ends of the sections by the fastening elements 19.

Figures 5, 6:
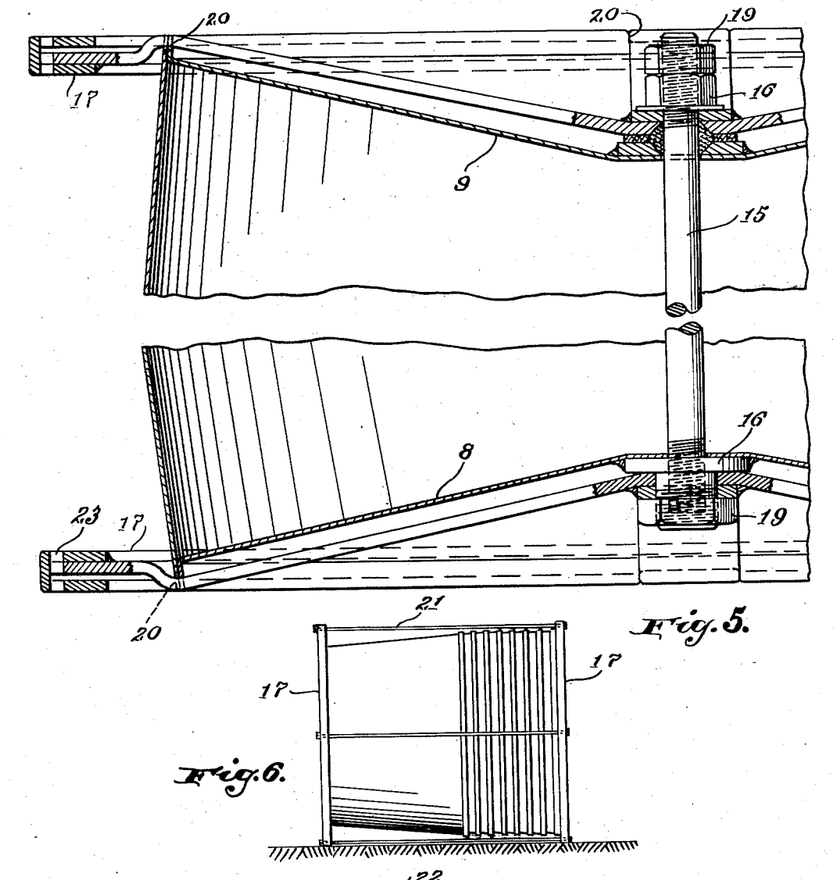
Figure 5 is a vertical sectional view, partly broken away, illustrating the relation of the hoops to the opposite ends of the sections of the nesting shipping drums.
Figure 6 is a side elevational view, illustrating the sections nested one within the other and the hoops arranged on the ends thereof and removably fastened thereto to retain the sections in nested position.

To prevent rotation of the hoops with relation to the sections 5 and 6, the ends 8 and 9, respectively, of said sections are provided with cutaway portions 20, in which portions of the spider rest, as illustrated in Figure 5 of the drawings. Thus, when the hoops are attached in the manner previously described, they form a permanent part of the sections and perform the dual function of preventing any contact with the central inner fitted portion of the sections when assembled and facilitate the easy handling of the filled unit during shipping thereof.

Figure 7:
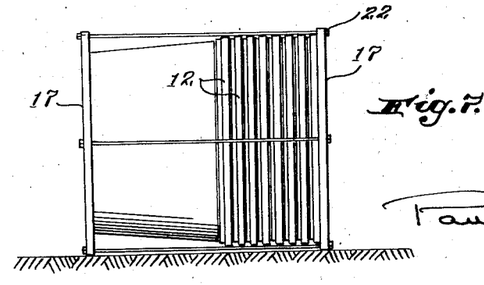
Figure 7 is a similar view to Figure 6.
Figures 8, 9:
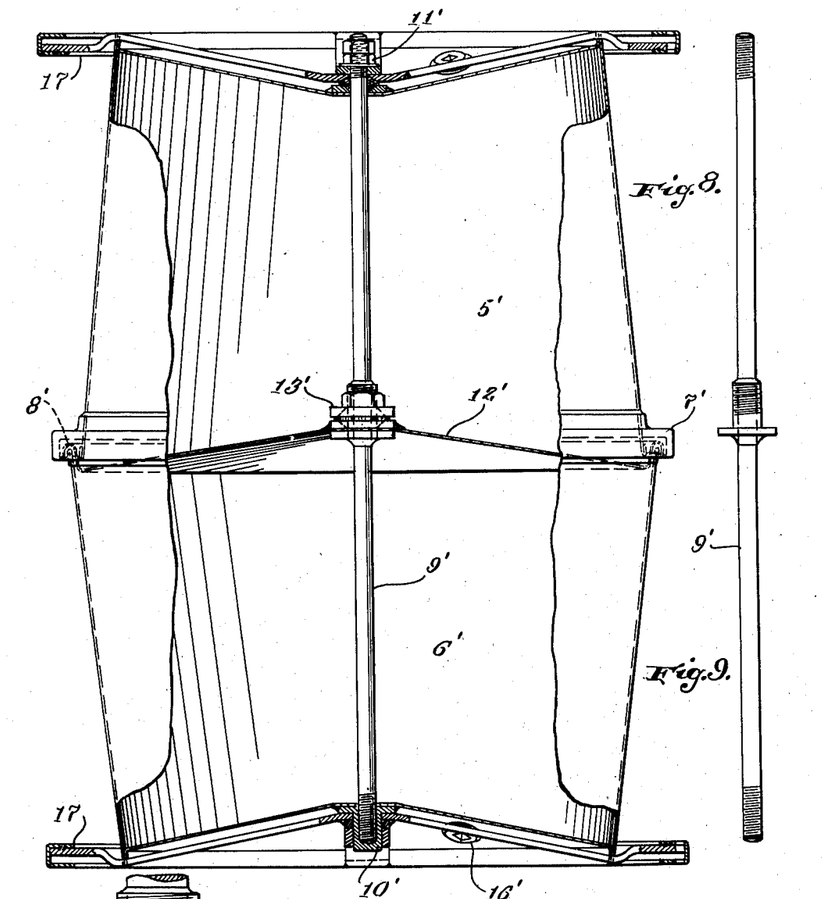
Figure 8 is a side elevational view, partly in section, of a slightly modified form of my improved nesting shipping drum, showing the sections divided one from the other, with a center partition.
Figure 9 is a side elevational view of the fastening bolt for the modified form illustrated in Figure 8.
Figure 10:
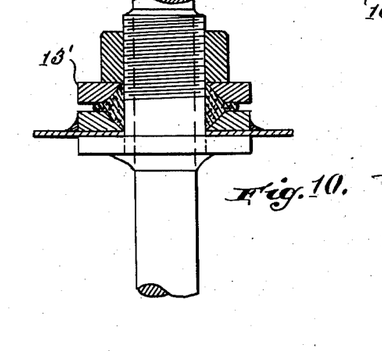
Figure 10 is an enlarged fragmentary detailed sectional view, partly broken away, illustrating the method of connecting the partition to the bolt.
Figures 11, 12, 13:
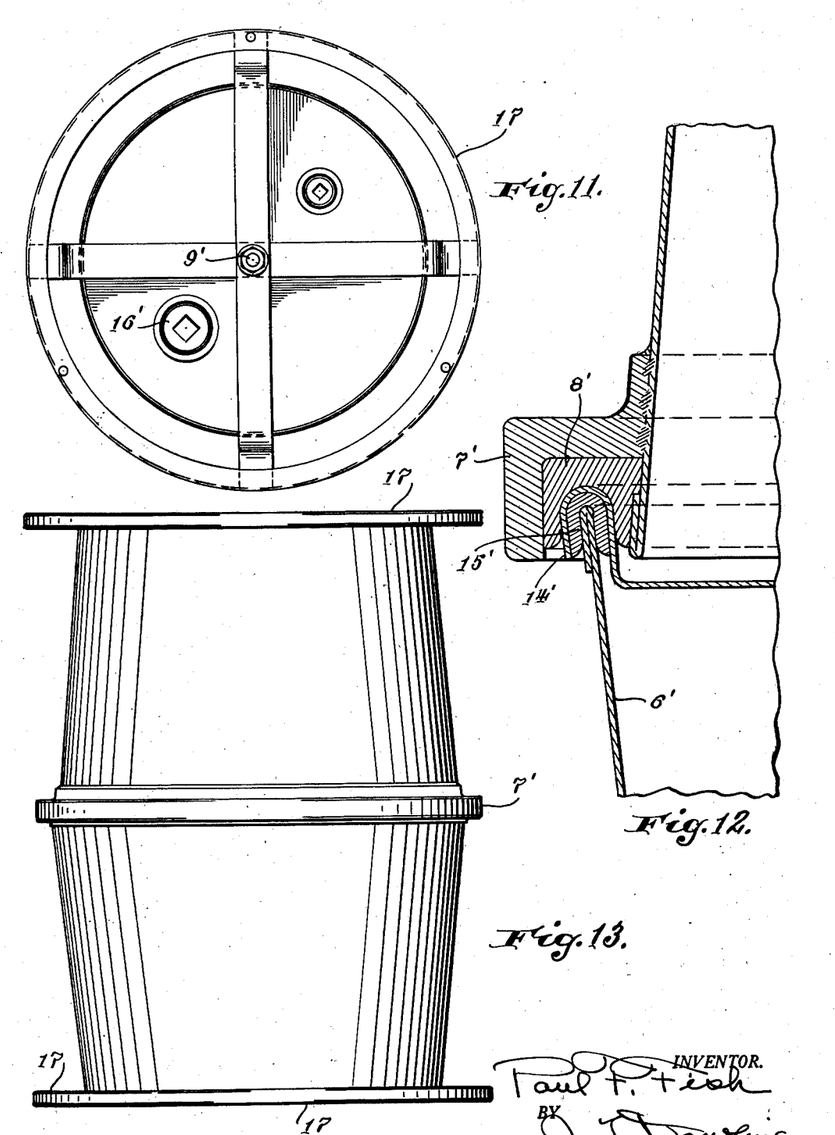
Figure 11 is a top plan view of the modified form shown in Figure 8.
Figure 12 is an enlarged vertical sectional view, partly broken away, illustrating the method of connecting the partition with the enlarged open ends of the sections.
Figure 13 is a side elevational view of the modified form in full assembled position with the hoops attached thereto.

When the unit is emptied and the section is divided by removing the fastening elements 16 and 19, respectively, the sections 5 and 6 are readily nested, one within the other, as shown in Figures 6 and 7, respectively, and the hoops applied to the inner fitted nested sections and fastened thereto by suitable bolts 21 and fastening elements 22, this permitting the individual nested sections with their respective hoops to be easily and quickly handled for return shipment.

These bolts 21 extend through openings 23 formed in the hoops 17, as clearly illustrated in Figure 5 of the drawings.

Figures 1, 2, 3, 4:
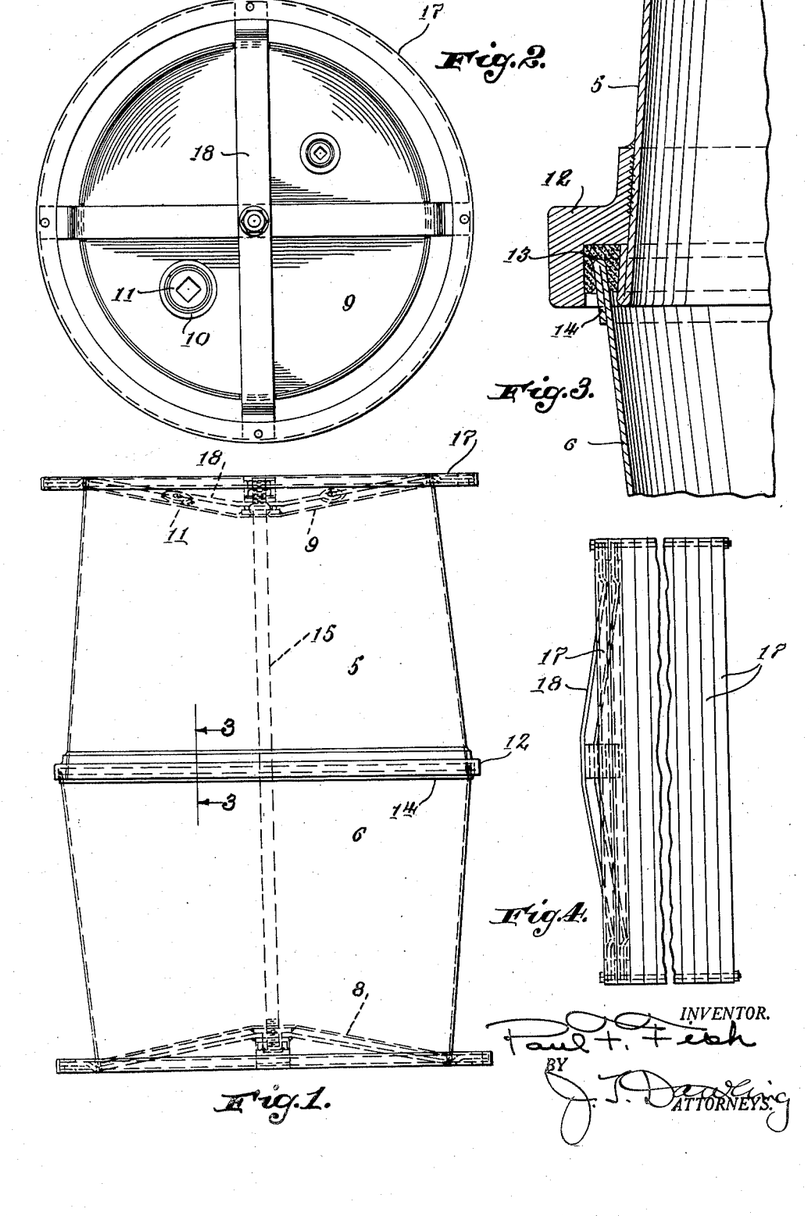
Figure 1 is a side elevational view of my improved nesting shipping drum assembled and equipped with removable hoops.
Figure 2 is a top plan view of the structure illustrated in Figure 1.
Figure 3 is an enlarged fragmentary sectional view, taken on the line 3—3 of Figure 1.
Figure 4 is a side elevational view, illustrating the manner of nesting the hoops.

It is to be understood that the main object of providing these hoops is to facilitate the easy handling of the filled sections, when assembled, and also provide means to prevent any contact with the center of said fitted sections, due to the fact that the diameter of the hoops is greater than that of the fitted enlarged ends of said sections. The hoops also provide means for allowing the easy handling of said filled sections, and the excess hoops, when the return shipment is made, may be readily nested and held together, as illustrated in Figure 4 of the drawings.

IN USE

The sections 5 and 6 are assembled in the manner illustrated and are fastened thereto by the element 15 and the fastening elements 16. The hoops are then applied with portions of their spiders resting in the grooves 20 in the opposite ends of the sections 5 and 6. The hoops are removably fastened to the respective sections by the fastening elements 19. The sections are then constituted into a single unit, ready to be filled and shipped. When emptied, the fastening elements are removed; the elements 16 are removed and the sections are divided and nested one within the other, and hoops applied at opposite ends of the nested sections and fastened thereto, as previously described. The excess hoops are also nested, as explained and illustrated in Figure 4 of the drawings.

*Modification illustrated in Figures 8, 9, 10, 11, 12, and 13*

Referring to the modification, the numeral 5' constitutes the female section and 6' the male section. The enlarged end of the female section 5' is provided exteriorly thereof with an annular channel member 7' to receive therein the enlarged end of the male section 6'. To facilitate the sealing of the sections, there is provided a suitable gasket 8', and this is identical in construction with the structure shown in the preferred Figures 1 to 7, inclusive.

To hold the sections 5' and 6' in tight, non-leakage position, I have provided a fastening element 9' which extends centrally through the opposite ends of the sections 5' and 6', respectively, and are fastened thereto by the medium of the fastening elements 10' and 11', respectively.

The sections 5' and 6', respectively, when assembled, are divided or separated one from the other, by a partition member 12', which is secured by its central portion to the fastening element 9' through the medium of the fastening elements 13'. The peripheral, marginal edge of the partition 12' is provided with a flange portion 14', which is adapted to be inserted against the gasket 8' of the channel member 7' of the female section 5'. This flange 14' is also provided with a sealing gasket 15' to receive the enlarged end of the section 6'. Thus, when the fastening element 9' is secured to the ends of the sections, the entire structure, including the partition, is drawn together tightly in non-leakage position and held as a single unit until the fastening elements are released.

The ends of the sections 5' and 6', respectively, are equipped with the usual hoops 17, which are made identical with those in the preferred form and are fastened thereto in the manner previously described.

It is to be understood that the ends of the sections 5' and 6', respectively, are each provided with filling openings and closures therefor, indicated by the numeral 16'. Thus, when assembled, each section, being divided as separate compartments by the partition 12', may be filled with different kinds of material and have no contact with one another.

It is to be understood that in the preferred form and modification illustrated in Figures 1 to 13, inclusive, the bilge portion constituted by the channel member 12 and 7', is wholly within the plane of the diameter of the hoops 17 and therefore incident to handling can never be struck or in any way receive any pressure thereon to cause leakage, all contact and pressure being absorbed by the peripheral portion of the hoops 17 during the handling thereof.

The operation of nesting the sections 5' and 6' and the hoops used therewith, is identical with that previously described in the preferred form.

*Modification illustrated in Figures 14, 15, 16, 17, 18, 19, 20, and 21*

Figures 14, 15, 16, 17:
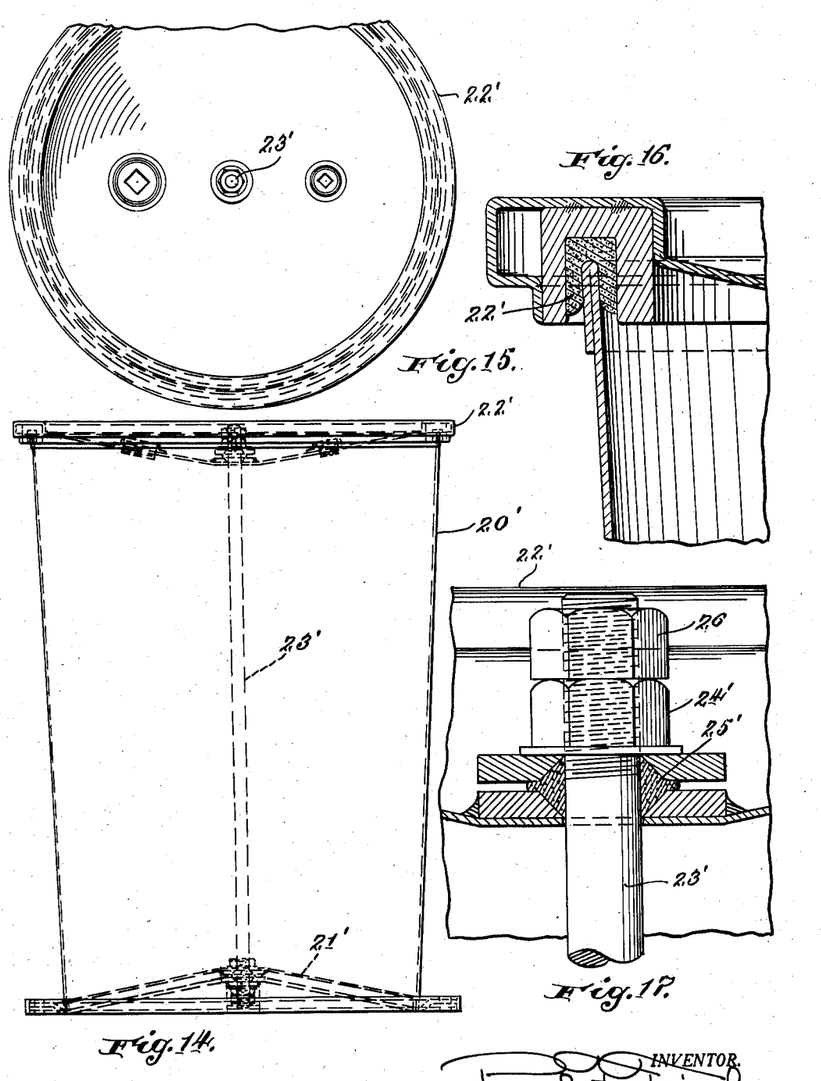
Figure 14 is a side elevational view of another modified form of the nesting drum, illustrating the same constructed in an individual section and the hoops applied thereto.
Figure 15 is a top plan view, partly broken away, of Figure 14.
Figure 16 is a fragmentary vertical sectional view, illustrating the method of closing the open end of said drum and the relation of the hoop thereto.
Figure 17 is a fragmentary side elevational view and partly in section of the fastening bolt illustrated in Figures 14 and 15.
Figure 18:
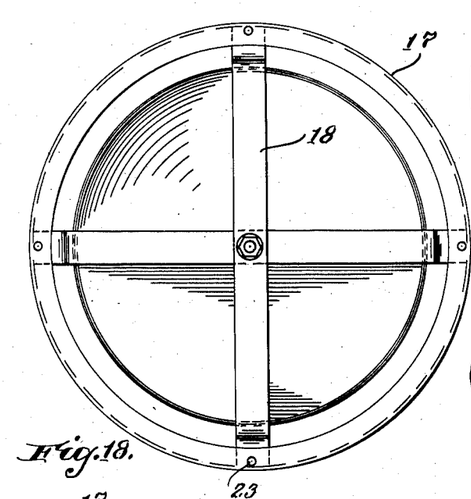
Figure 18 is a top plan view of Figure 14, illustrating the hoops attached thereto.

Referring to the modification in the above named figures, there is shown a single unit or section substantially frusto-conical, having a body 20' which has its smaller end closed, as at 21', its open end receiving a sealed gasket containing cover 22', which fits down tightly over the open end of the section 20', as clearly illustrated in Figure 16.

Extending centrally through the bottom 21' and cover 22' is a bolt 23', which has its opposite ends extending through these respective end members and sealed thereto by suitable fastening elements 24', and to avoid and prevent leakage there is inserted between the end members and the fastening elements, suitable sealing means or material 25'.

Figure 19:
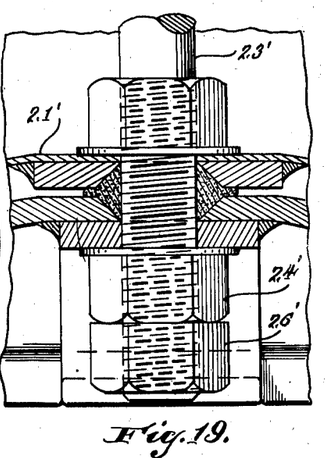
Figure 19 is a fragmentary enlarged, partly in section, side elevational view, illustrating the method of connecting the hoops and end to the section of the drum.

To facilitate the handling of this section 20', there is secured to the extended ends of the fastening element 23', hoops 17 of the identical structure with those in the preferred form, these hoops having the usual spider 18, the central portion of which is provided with an opening to receive the extended ends of the fastening element 21, and these hoops are sealed to the opposite ends of the section 20' by fastening elements 26', as illustrated in Figures 17 and 19, respectively.

It is to be understood that the peripheral edge of the end member 21' and cover member 22' are provided with suitable studs to receive a portion of the spider 18 therein, which prevents circumferential rotary motion of the hoops 17 after being sealed or fastened to the section 20'.

Figure 20:
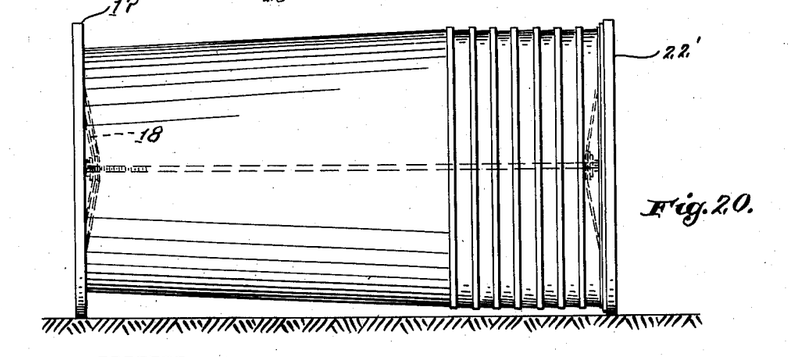
Figure 20 is a side elevational view showing the drum sections nested and with the removable hoops attached thereto.

This individual section has been provided to facilitate a means for shipping material in a given unit, and at the same time providing means that by its construction it can be readily nested, when emptied, as shown in Figure 20, and hoops applied thereto so that the empties can be easily handled and the shipping rates for the return thereof materially reduced.

Figure 21:
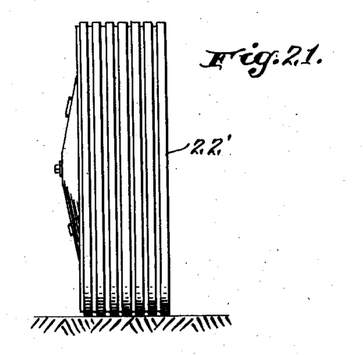
Figure 21 is a side elevational view illustrating the removable covers in nested position and ready for shipment.
Figure 22:
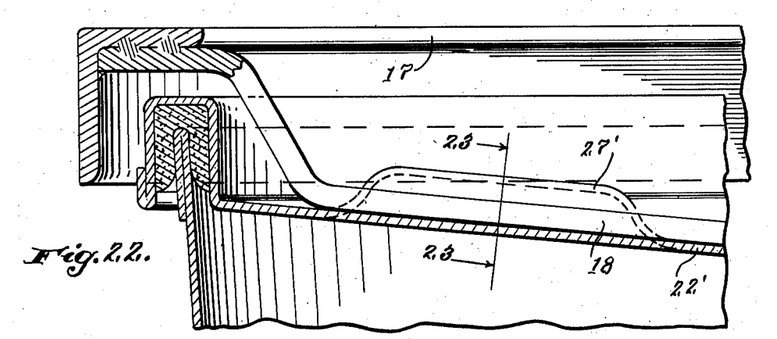
Figure 22 is another modified form, illustrating the method of attaching the hoop to the ends of the sections and the means for preventing rotation thereof.
Figures 23, 24, 25:
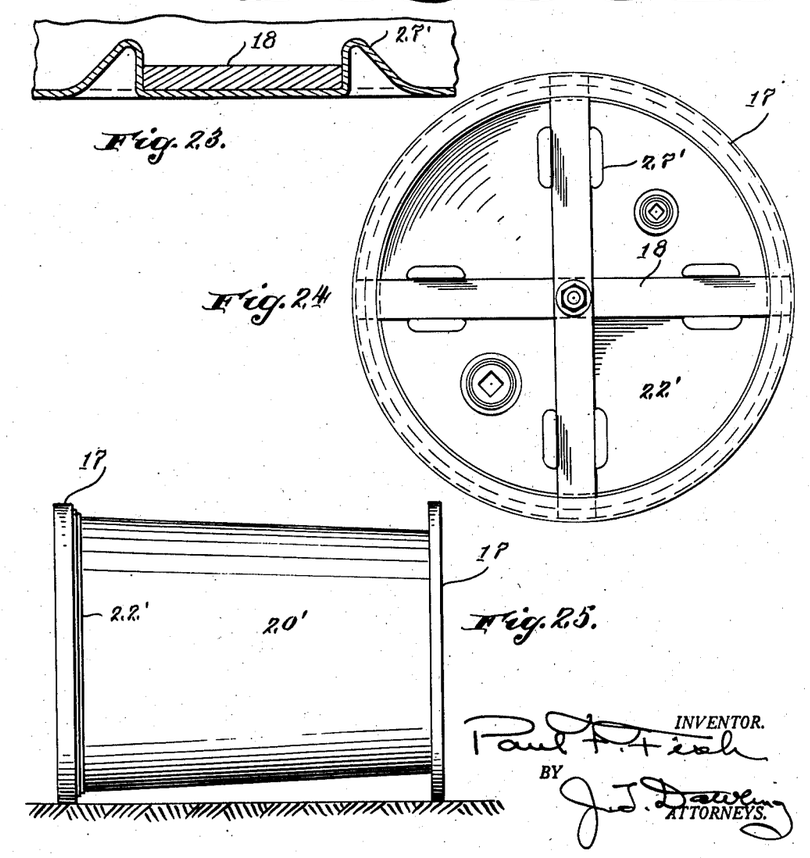

It is also to be understood that the closures 22' are also of such construction as to be readily nested, as illustrated in Figure 21, and fastened so that the return shipment thereof may be expedited.

*Modification illustrated in Figures 22, 23, 24, and 25*

This modification pertains to section 20' or the preferred section, or other types of structure, if found necessary, and the ends 21' and 22' are provided with spaced stud members 27' to receive the supporting spider portion of the hoops therein so as to prevent the rotational movement thereof of the hoops with relation to the section 20' when attached thereto.

It is to be understood that any type of fastening means and structures to prevent rotation of the hoops may be used, the principal object of the illustration being to show that various methods of preventing rotational movement of the hoops can be used.

It can be readily seen that the individual frusto-conical member 20' is of a separate, single unit, but is of such construction as to be readily nested, when emptied, and equipped with its hoops to facilitate the handling thereof incident to return shipment, and it is equally true that this individual unit, when filled, has removable hoops secured thereto in the manner described, which hoops protect the fitted end of the closure 22', as all shocks and jars incident to shipping will be absorbed by said hoops.

It is to be understood that certain minor changes may be resorted to without departing from the spirit and scope of the invention as claimed.

Having thus described my invention, what I claim as new is:

1. In a drum or barrel of the nesting section type, comprising a container body made up of frusto-conical shaped sections adaptable when disassembled of being nested one within the other for compactness in return shipment, hoops of an outside diameter greater than any portion of said body, and means providing sufficient clearance between said hoops and body whereby the hoops may be readily gripped by the hands for convenience in handling the drum, said hoops functioning to protect the drum and facilitate rolling and handling thereof, means rigidly and removably connecting said body sections and said hoops to the opposite ends of said body and at a point substantially in line with the axis of said body, said means comprising spider like members having radiated spokes fixedly attached to their respective hoop members, said spokes being detachably engaged to the respective opposite ends of the drum body by means of notches, when in normal engaged position, the same providing means whereby any impact or blow upon either of the hoops, substantially all of the force of the impact will be distributed by the hoops to their respective spoke and notch structures for purposes of absorbing and distributing the impact force about the peripheral edges of the ends of the drum body.

2. In a drum or barrel of the nesting section type, a container body made up of frusto-conical shaped sections adaptable when disassembled of being nested one within the other for compactness in return shipment, hoops of an outside diameter greater than any portion of said body, means for providing at predetermined points clearance between the hoops and the rims of the small ends of said drum sections; said hoops functioning to protect the drum and facilitate rolling and handling thereof, means rigidly and removably connecting said body sections and said hoops to the opposite ends of said body and at a point substantially in line with the axis of said body, said latter means including a rod member projected through the interior of said drum to hold the sections in assembled position and spider members fixedly engaged to said hoop members and detachably connected to the rod member, a sealing joint formed at the point of engagement between the body members when in normal assembled relation, and means for tightly sealing the joint between the sections when the latter are in normal assembled relation.

PAUL F. FISH.